Jan. 5, 1960  F. D. BONNIN  2,919,757
SUSPENSION FOR DRIVEN TANDEM AXLE
Filed Feb. 17, 1958  2 Sheets-Sheet 1

FRED D. BONNIN
INVENTOR
HUEBNER & WORREL
ATTORNEYS
BY

Jan. 5, 1960 F. D. BONNIN 2,919,757
SUSPENSION FOR DRIVEN TANDEM AXLE
Filed Feb. 17, 1958 2 Sheets-Sheet 2

FRED D. BONNIN
INVENTOR
HUEBNER & WORREL
ATTORNEYS

United States Patent Office

2,919,757
Patented Jan. 5, 1960

2,919,757

SUSPENSION FOR DRIVEN TANDEM AXLE

Fred D. Bonnin, Malaga, Calif.

Application February 17, 1958, Serial No. 715,570

4 Claims. (Cl. 180—22)

The present invention relates to a vehicle supporting structure and more particularly to a tandem axle vehicle support having ground wheels thereon in which said wheels have driving interconnection.

Supporting load transporting vehicles by tandem axle arrangements to increase the capacity of the vehicles is well-known. Such arrangements include relatively forwardly and rearwardly disposed axles on which are mounted earth engaging wheels, and spring suspension systems which mount the frame on the axles.

It has been conventional to apply positive drive to the forwardmost axle of a tandem axle support but to allow the rearwardmost axle merely to tag along behind for vehicle support purposes only. Because this arrangement does not develop sufficient tractive power it has resulted in spinning of the forward wheels when performing certain operations on snow, mud, ice, and other slippery surfaces. An obvious expedient for increasing the traction of such a vehicle is to drive both axles. However, prior to the present invention, such dual drive has involved expensive transmission systems which have been subject to mechanical difficulties. Further, the transmission systems have been difficult to install and have usually not been available unless factory installed. Thus, an object of the present invention is to make available a simple, economical, and conveniently installed dual drive system for tandem axles.

The present invention includes the discovery that driving-driven interconnection of the ground wheels on tandem axles can readily be provided by means of belts circumscribing pulleys or sheaves mounted concentrically on such wheels. However, the utilization of belt interconnected wheels has created other problems in relation to the spring suspension systems and manner of mounting the frame on the axles. In tandem axle systems of the prior art, the axles moved toward and away from each other incident to relative elevational movement of the axles during travel of the vehicle over the ground. Obviously, relative fore and aft movements of axles to any appreciable extent cannot be accommodated with a belt drive. In fact, appreciable movements of the axles toward each other loosens the belt and renders the drive either partially or wholly inoperative, and excessive movements of the axles away from each other subjects the belt to undue strain.

Accordingly, it is another object of the present invention to mount a load supporting frame on tandem axles which support ground wheels have driving-driven interconnection by means of a belt arrangement without impairing the action of the belt drive.

Another object is to minimize excessive loosening and/or tightening of the belt drive in a tandem axle support for vehicles of the character described.

Another object is to provide a spring suspension system for a frame borne by tandem axles in which the axles are maintained in substantially predetermined spaced relation to each other during earth traversing movement of the frame.

Another object is to drive the wheels mounted on one of the axles of a tandem axle spring suspension system in a vehicle by a pulley belt interconnecting the wheels on both of the axles without impairing the action of the spring suspension system.

Another object is to enable adjustments of the tension of a pulley belt in a belt-interconnected tandem axle support system for a vehicle.

Other objects are to provide apparatus of the character described which are simple and economical to construct, install, maintain, and adjust; which are adapted for use on a variety of vehicles and types of spring suspension systems; and which are dependable in action and durable for heavy duty over extended periods of time.

These, together with other objects, will become more fully apparent upon reference to the following description and accompanying drawings.

Figure 1:
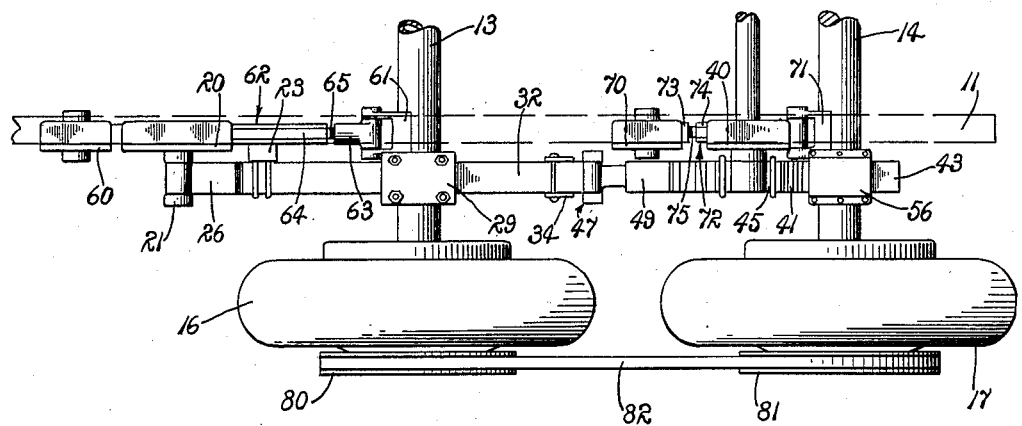
Fig. 1 is a fragmentary top plan view of a load transporting vehicle embodying the principles of the subject invention.
Figure 2:
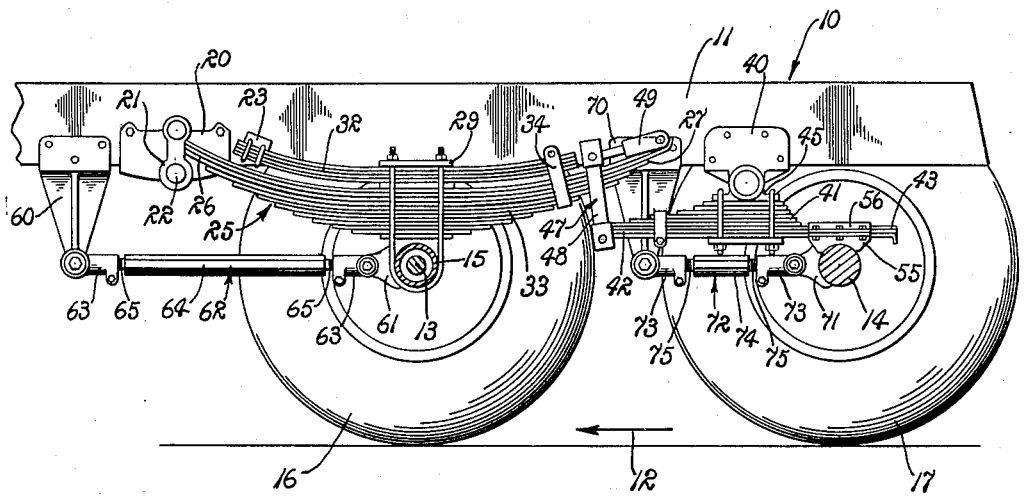
Fig. 2 is a longitudinal section of a load transporting vehicle and showing the principles of the subject invention in greater detail.

Referring more particularly to the drawings, a vehicle constituting a convenient operational environment for describing the subject invention is generally indicated by the numeral 10 and includes a substantially horizontal frame 11. For convenient reference, an arrow 12 is employed for indicating the forward direction of movement of the vehicle. Elongated forward and rearward axles 13 and 14 are positioned in spaced parallel relation beneath the frame, and front and rear wheels 16 and 17 are mounted on opposite ends of the axles and are adapted to support the frame for earth traversing movement along a predetermined line of travel. As will be seen, the axles are connected in tandem. Although only one side of the frame 11 is illustrated in each of Figs. 1 and 2, it is to be understood that the other side is identical, and accordingly, only one side will be described in detail. As is well-known, the axle 13 is journaled in a housing 15 and is power driven from any suitable automotive source of power, not shown. For illustrative purposes, the axle 13 can be visualized as the drive axle of any tandem axle truck.

A front spring hanger 20 is rigidly mounted on the frame 11 in forwardly spaced relation to the forward axle 13. A front shackle 21 is mounted on the hanger for pivotal movement on a pivot pin 22 which is parallel to the axles. Further, a front slide receptacle 23 is rigidly mounted on the frame rearwardly adjacent to the front hanger. Forward elongated upwardly concaved leaf springs 25 provide a forward end portion 26 connected to the front shackle by means of an eyelet formed in said forward end portion, and a rearward end portion 27. A clamp 29 rigidly mounts the forward springs intermediate their end portions on the housing 15. The forward springs include a set of auxiliary springs 32 having a forward end portion slidably received in the receptacle 23 and a rearward end portion connected to the main leaf springs 33 by means of a rebound clamp 34.

A rear spring hanger 40 is rigidly secured to the frame 11 in forwardly spaced relation to the rearward axle 14. Elongated rear leaf springs 41 provide forward end portions 42 and rearward end portions 43. A rear spring clamp 45 is rigidly connected to the rear springs intermediate its end portions and pivotally mounts the rear springs on the rear spring hanger for movement about an axis substantially parallel to the axles 13 and 14. A rear shackle 47 includes a load dividing portion 48 pivotally connected to the forward end portion 42 of the rear springs, and a connecting portion 49 pivotally interconnecting the rearward end portion 27 of the forward springs 25 and said load dividing portion.

A bearing housing 55 is rigidly mounted on the rearward axle 14 and mounts the rearward end portion 43 of the rear springs 41 for longitudinal slidable movement therein. The housing is provided with a cover 56 for capturing the springs and limiting upward movement thereof. The rear end portion 43 is downturned to prevent escape of the rear springs forwardly from the housing. It is to be noted that the forward and rearward springs are in substantial fore and aft alignment and constitute a spring suspension system interconnecting the frame 11 and the axles whereby the axles are relatively movable upwardly and downwardly from a substantially common horizontal plane when the wheels 16 and 17 are on level ground into positions raised and lowered relative to each other when the wheels are relatively raised and lowered. Such a load transporting vehicle 10 and spring suspension system is well-known and merely constitutes an acceptable although by no means an exclusive environment for the subject invention.

A front frame mounting bracket 60 is rigidly connected to the frame 11 by welding, riveting, or the like, in forwardly spaced relation to the forward axle 13 and is downwardly extended from the frame. An arm 61 is rigidly connected to the forward axle housing 15 and forwardly extended therefrom. An elongated front radius rod 62 includes opposite end sleeves 63 individually pivotally connected to the frame mounting bracket and the arm and provide opposed internally threaded sockets. An adjusting intermediate beveled portion 64 provides threaded ends 65 screw-threadably received in the sockets of the sleeves. The front radius rod thus pivotally interconnects the forward axle 13 and the frame 11 through the frame mounting bracket.

In addition, a rear frame mounting bracket 70 is similarly rigidly connected to the frame 11 in forwardly spaced relation to the rearward axle 14 and downwardly extended from the frame. An arm 71 is rigidly connected to the rearward axle 14 and forwardly extended therefrom. A rear radius rod 72 somewhat shorter in length than the front radius rod 62 provides sleeves 73 individually pivotally connected to the arm 71 and rear mounting bracket, and an intermediate beveled adjusting portion 74 having threaded ends 75 screwthreaded into the sleeves, all in the same manner as described in connection with the front radius rods, preferably both of the radius rods are mounted in rubber bearings borne by the mounting brackets and the arms for allowing limited and cushioned fore and aft movements of the radius rods. Exept for the minor movements permitted by such bearings, the radius rods mount their respective axles in predetermined spaced relation to the frame mounting brackets and thus resist movement of the axles toward and away from each other. Either of the radius rods can be longitudinally extended or contracted by turning their respective intermediate portions 64 and 74. In addition to another purpose to be described, the adjustment of the radius rods effects a change in the character of the springs 25 and 41 which may be desired for transporting loads of various weights or when traveling over various types of terrain.

A drive pulley 80 is rigidly mounted on the front wheel 16, a driven pulley 81 is rigidly mounted on the rear wheel 17 in substantially coplanar relationship with the drive pulley, and an elongated endless pulley belt 82 encircles the drive and driven pulleys whereby the rear wheel is rotatably driven by the front wheel. Alternatively, the drive pulley could be connected to the forward axle 13 inasmuch as the front wheel is rigidly connected to the forward axle and the latter is journaled in the axle housing 15. It is of course well-known in the art that the forward axle or wheel in a tandem axle arrangement is usually power driven. The described conventional pulley belt arrangement allows positive drive to be transmitted also to the rear wheel whereby increased traction and ground driving power is obtained. It will be evident that the radius rod adjustments described above enable tightening or loosening of the pulley belt 82 inasmuch as shortening or lengthening of the radius rods increases or decreases the spacing between the forward and rearward axles 13 and 14.

Operation of the first form

The operation of the described embodiment of the subject invention is believed to be readily apparent but is briefly summarized at this point. Preliminarily, it is reiterated that the pulley belt arrangement described above is designed to transmit positive rotation to the rear wheel 17 from the forward wheel 16 or axle 13. This is dependent upon maintaining a proper pulley belt tension which cannot occur if the spacing between forward and rearward axles 13 and 14 varies appreciably during earth traversing movement of the vehicle 10.

When the vehicle 10 is traveled over level ground so that the axles 13 and 14 remain in a substanially common horizontal plane, the radius rods 62 and 72 hold the axles in predetermined spaced relation to each other thereby providing predetermined belt tension.

Figure 3:
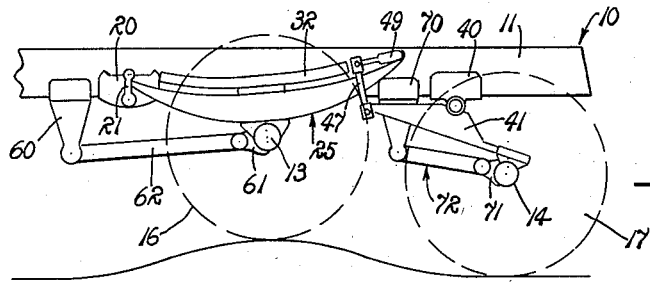
Fig. 3 is a schematic diagram illustrating the operation of the vehicle supporting structure of the present invention with the leading wheels raised relative to the trailing wheels during earth traversing movement.

With reference to Fig. 3, when the front wheels 16 rise relative to the rear wheels 17, the forward springs 25 pivot on the front shackle 21 about the pivot pin 22. This also causes the forward axle to pivot in an arcuate path concentric to the forward pivot axis of the front radius rod 62 on the front mounting bracket 60. At the same time, the rearward end portion 27 of the forward springs 25 raises the forward end portion 42 of the rear springs 41 upwardly, causing the rearward end portion 43 to move downwardly. However, the rear radius rod 62 constrains movement of the rearward axle 14 to an arcuate path concenric to the forward pivot axis of the rear radius rod so that the distance between the axles remains substantially the same as when the axles were in a common horizontal plane, that is, assuming limited relative elevational movement of the axles. As a practical matter, the total vertical movement of the axles is only a few inches and within this range, no appreciable change in the spacing of the axles takes place.

Figure 4:
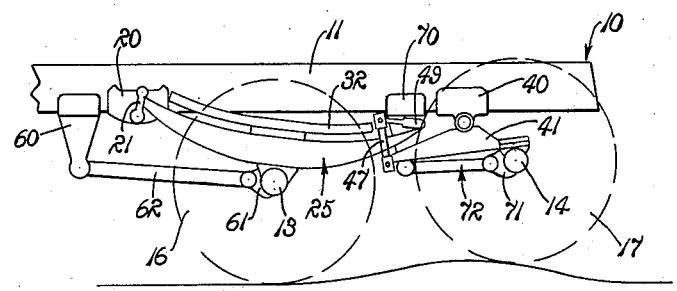
Fig. 4 is a view similar to Fig. 3 but with the trailing wheels raised relative to the leading wheels.

A similar though reverse relative elevational movement of the axles 13 and 14 occurs when the rear wheels 17 raise relative to the front wheels 16, as illustrated in Fig. 4. As before, the radius rods maintain the axles in substantially the same spaced relation as the vehicle travels over the ground to keep approximately the same tension on the pulley belt 82.

It will be evident that this prevents the pulley belt 82 from slackening incident to movement of the axles 13 and 14 closer together so that proper drive is always transmitted to the rear axle. Further, since movement of the axles away from each other is resisted, tension on the pulley belt is not increased to the point where it would impose a braking action on the wheels or break the belt under the excessive strain.

Second form

Figure 5:
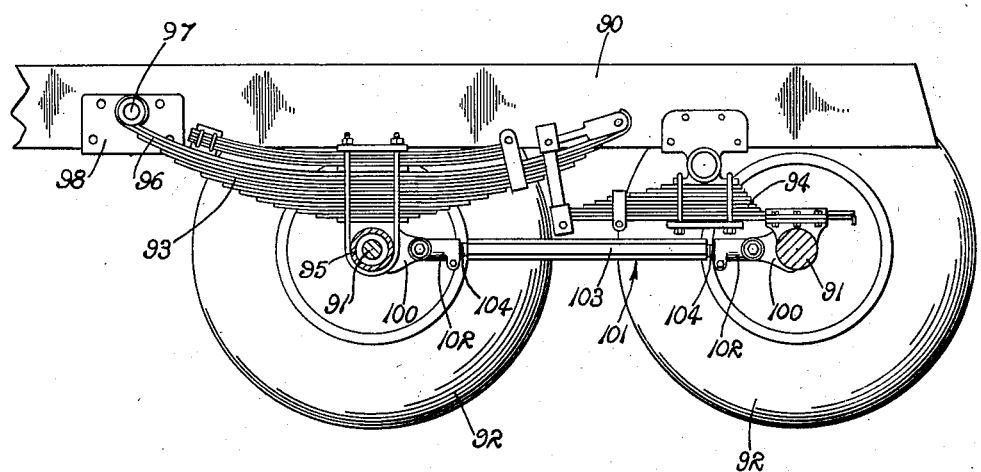
Fig. 5 is a view similar to Fig. 2 but showing another form of the subject invention.

With reference to Fig. 5, a second form of the subject invention is incorporated in a vehicle employing a frame 90, forward and rearward tandem axles 91, ground engaging wheels 92, and forward and rearward springs 93 and 94, respectively. Axle housing 95 circumscribes the forward axle. As before, the springs connect the axles to the frame. Although not shown, the wheels are interconnected by a pulley and belt arrangement as with the first form of the invention. The forward and rearward springs are interconnected as in the first form of the invention, the rearward springs are connected to the rearward axle as before, but the forward springs provide a forward end portion 96 having an eyelet rotatably fitted on a pin 97 laterally extended from a bracket 98 on the frame 90.

Arms 100 are rigidly connected to the front axle housing 95 and the rear axle 91 and extended rearwardly and forwardly therefrom, respectively. An elongated radius rod 101 provides opposite end sleeves 102 pivotally connected to the arms and preferably mounted in cushioned bearings, and in intermediate adjusting portion 103 having ends 104 screw-threaded in the sleeves for adjustment purposes, as before.

The second form of the invention effects the same purposes as the first form in that the axles 91 are maintained in predetermined spaced relation but such spacing can be adjusted by turning the intermediate portion 103.

From the foregoing, it will be evident that load supporting structure has been provided for mounting the axles on a frame of a vehicle employing a spring suspension system in such a manner that the support wheels can be interconnected by a pulley belt driving arrangement. The axles are mounted so that the spring suspension system and pulley belt arrangement operate without undesirable interference with each other and whereby limited relative elevational movements of the axles are permitted without undesirable effect on the pulley belt drive.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a load transporting vehicle including an elongated frame having opposite sides and opposite forward and rearward end portions, longitudinally spaced relatively forward and rearward axles extended in spaced substantially parallel relation transversely beneath the frame, ground engaging wheels mounted on the forward and rearward axles, substantially coplanar pulleys connected to the wheels on the forward and rearward axles adjacent to a side of the frame, and an elongated endless belt tensioned about the pulleys for driving interconnection of the wheels; an apparatus for supporting the axles on the frame for alternate upward and downward movement toward and away from the frame and in substantially uniformly spaced relation during said movement to maintain substantially uniform tension on the pulley belt comprising upwardly convexed forward leaf springs having forward and rearward end portions; rearward leaf springs having forward and rearward end portions; means mounting the rearward leaf springs intermediate said end portions on the frame for pivotal movement about an axis substantially parallel to the axles; means mounting the forward springs intermediate their ends on the forward axle in substantial alignment longitudinally of the frame with the rearward springs; rear shackle means pivotally interconnecting the forward and rearward end portions of the rearward and forward springs, respectively; forward shackle means pivotally interconnecting the forward end portion of the forward springs and the frame, the pivotal interconnections of said shackle means being on axes substantially parallel to the axles; means mounting the rearward end portion of the rearward springs on the rear axle, the axles being thereby interconnected by the springs and the shackle means for alternate movement upwardly and downwardly from positions in a common plane substantially parallel to the frame; elongated front and rear radius rods having forward and rearward end portions; means individually connecting the rearward end portions of the front and rear radius rods to the forward and rearward axles, respectively; and means connected to the frame individually pivotally mounting the forward end portions of the radius rods in forwardly spaced relation to their respective axles and in substantially equally downwardly spaced relation to the frame for elevational pivotal movement about pivot axes parallel to the axles, the spacing between the frame and the pivot axes of the radius rods being substantially equal to the spacing between the frame and the axles when the axles are in said common plane whereby the radius rods have neutral positions in said plane and are elevationally pivotal upwardly and downwardly from said plane with their respective axles.

2. The axle mounting apparatus of claim 1 wherein the radius rods are individually longitudinally adjustable for adjusting the spacing between the axles and thereby to adjust the tension on the pulley belt and for also adjusting the tension on the forward and rearward leaf springs.

3. The apparatus of claim 1 wherein the axles have opposite ends, and wherein each radius rod has a longitudinal axis and includes a pair of sections interconnected for relative rotational movement about their respective longitudinal axes thereby to accommodate relative upward and downward movements of opposite ends of the axles.

4. The axle mounting apparatus of claim 1 wherein said means connected to the frame and pivotally mounting the forward end portions of the radius rods are brackets rigidly connected to the frame, the bracket associated with the front radius rod being positioned forwardly of the pivotal connection of the forward end portion of the forward leaf springs to the frame.

References Cited in the file of this patent

UNITED STATES PATENTS

| | | |
|---|---|---|
| 1,702,809 | Brown | Feb. 19, 1929 |
| 1,757,759 | Van Leuven | May 6, 1930 |
| 1,817,028 | Brockway | Aug. 4, 1931 |
| 2,271,061 | Castillo | Jan. 27, 1942 |
| 2,424,141 | Black | July 15, 1947 |
| 2,571,412 | Bonnin | Oct. 16, 1951 |
| 2,733,612 | Sterkel | Feb. 7, 1956 |
| 2,772,891 | Bonnin | Dec. 4, 1956 |